United States Patent [19]

Mustonen

[11] Patent Number: 5,262,608
[45] Date of Patent: Nov. 16, 1993

[54] UNDERWATER TORCH CUTTING AND WELDING APPARATUS

[76] Inventor: Reino S. Mustonen, Ellentie 1, 16100 UusikyläNastola, Finland

[21] Appl. No.: 707,051

[22] Filed: May 29, 1991

[30] Foreign Application Priority Data

Apr. 24, 1991 [FI] Finland .................................. 911999

[51] Int. Cl.⁵ .............................................. B23K 9/00
[52] U.S. Cl. ..................................... 219/72; 219/69.1
[58] Field of Search .................. 219/136, 72, 70, 69.1, 219/68

[56] References Cited

U.S. PATENT DOCUMENTS

| | | | |
|---|---|---|---|
| 2,490,302 | 12/1949 | Holfelder | 219/69.1 |
| 4,172,974 | 10/1979 | Stingelin et al. | 219/72 |
| 4,259,562 | 3/1981 | Cammann et al. | 219/68 |
| 4,780,944 | 11/1988 | Niinivaara et al. | 219/70 |
| 4,842,154 | 6/1989 | Niinivaara | 219/136 |

*Primary Examiner*—Clifford C. Shaw
*Attorney, Agent, or Firm*—Sandler, Greenblum & Bernstein

[57] ABSTRACT

An apparatus for torch cutting and welding which is safe, easy to use, accurate, provides an exceptionally clean cut of any desired shape, and can be brought into a non-operating state by the operator underwater. The apparatus includes a body having at least a first chamber and a second chamber, a hydraulic motor fitted in the first chamber and communicating with an external source of a pressurized liquid medium. At one end of a movable shaft of the motor, an elongated electrode is connected, at least a portion of which is adapted to extend out of the body through an opening in the body. Via the shaft, the motor transmits a rotating or reciprocating motion to the electrode. An electric current is conducted from an external power supply source to the electrode via an electrically conductive member which is fitted in the second chamber around at least a portion of the electrode.

19 Claims, 1 Drawing Sheet

UNDERWATER TORCH CUTTING AND WELDING APPARATUS

BACKGROUND OF THE INVENTION

The present invention relates to the field of torch cutting and welding metallic objects underwater by means of an electric arc established between an electrode and the metallic object. Such metallic objects can be underwater portions of ships and the like, fixed submerged structures such as bridge pillings and especially underwater portions of offshore oil and gas drilling platforms.

The most frequently utilized electric-arc cutting process underwater is the oxygen arc process wherein an electric arc is struck between an electrode and the workpiece. Simultaneously a stream of oxygen gas is blown into the arc. This cutting process is inaccurate and results in a rough cutting trace. The oxygen gas bubbles reduce the sight of the operator and further the use of oxygen increases the safety hazards.

U.S. Pat. No. 4,842,154 discloses a disc arc cutting apparatus wherein an arc is generated between the periphery of the disc and the workpiece. The rotating disc is moved along the workpiece which will melt and the rotational movement of the disc will remove melted material from the workpiece. The main problem with this technique is related to the safety hazards of the rotating disc. With the disc arc cutting process it is not possible to obtain holes and the like in the workpiece.

SUMMARY OF THE INVENTION

An object of this invention is to provide a new underwater torch cutting and welding apparatus which is safe, easy to use, accurate and provides a very clean cut of any desired shape.

A further object of the invention is to provide a new underwater torch cutting and welding apparatus which can be brought into a non-operating state by the operator underwater.

According to the present invention there is provided an apparatus for underwater torch cutting and welding comprising a body having at least a first chamber and a second chamber; a hydraulic motor fitted in said first chamber and communicating with an external source of a pressurized liquid medium, said motor having a movable shaft; an elongated electrode one end of which is connected to said shaft, and at least a portion of said electrode being adapted to extend out of said body through an opening in said body, said motor transmitting through said shaft a rotating or reciprocating motion to said electrode; electrically conductive means fitted in said second chamber around at least a portion of said electrode and through which conductive means electric current is conducted from an external power supply source to said electrode.

According to a further aspect of the invention said apparatus further comprises means defining a passageway from said first chamber through said second chamber to said opening in said body for said pressurized liquid medium. Thus the pressurized liquid medium drives the motor, flows through the apparatus as a cooling and cleaning medium and finally removes molten metal from the workpiece.

The pressurized liquid medium is preferably water or oxygen enriched water.

According to a yet further aspect of the invention said apparatus further comprises means for moving said electrode from a first non-operating position wherein the free end of said electrode is inside said body to a second operating position wherein said free end of said electrode is outside said body. This structure enables the operator to "switch off" the apparatus.

The elongated electrode use according to the present invention can be a consumable electrode or more preferably a non-consumable electrode. Suitable materials for non-consumable electrodes are for example tungsten based materials. The electrode can have various cross-sectional shapes, such as circular, quadrangular, hexagonal or elliptical. The electrode can also be provided with vertical or horizontal or spiral grooves to promote the removal of the melt formed by the arc. The electrode can also be hollow allowing passing the cooling liquid medium inside the electrode.

The elongated electrode is moved by means of the hydraulic motor in a rotating or reciprocating motion or in a combination of these motions. The rate of the rotating motion of the electrode is typically 0–30000 rpm.

When the apparatus according to the invention is used for welding purposes a filler wire or the like should be used.

DETAILED DESCRIPTION OF THE PREFERRED EMBODIMENT

Figure 1:
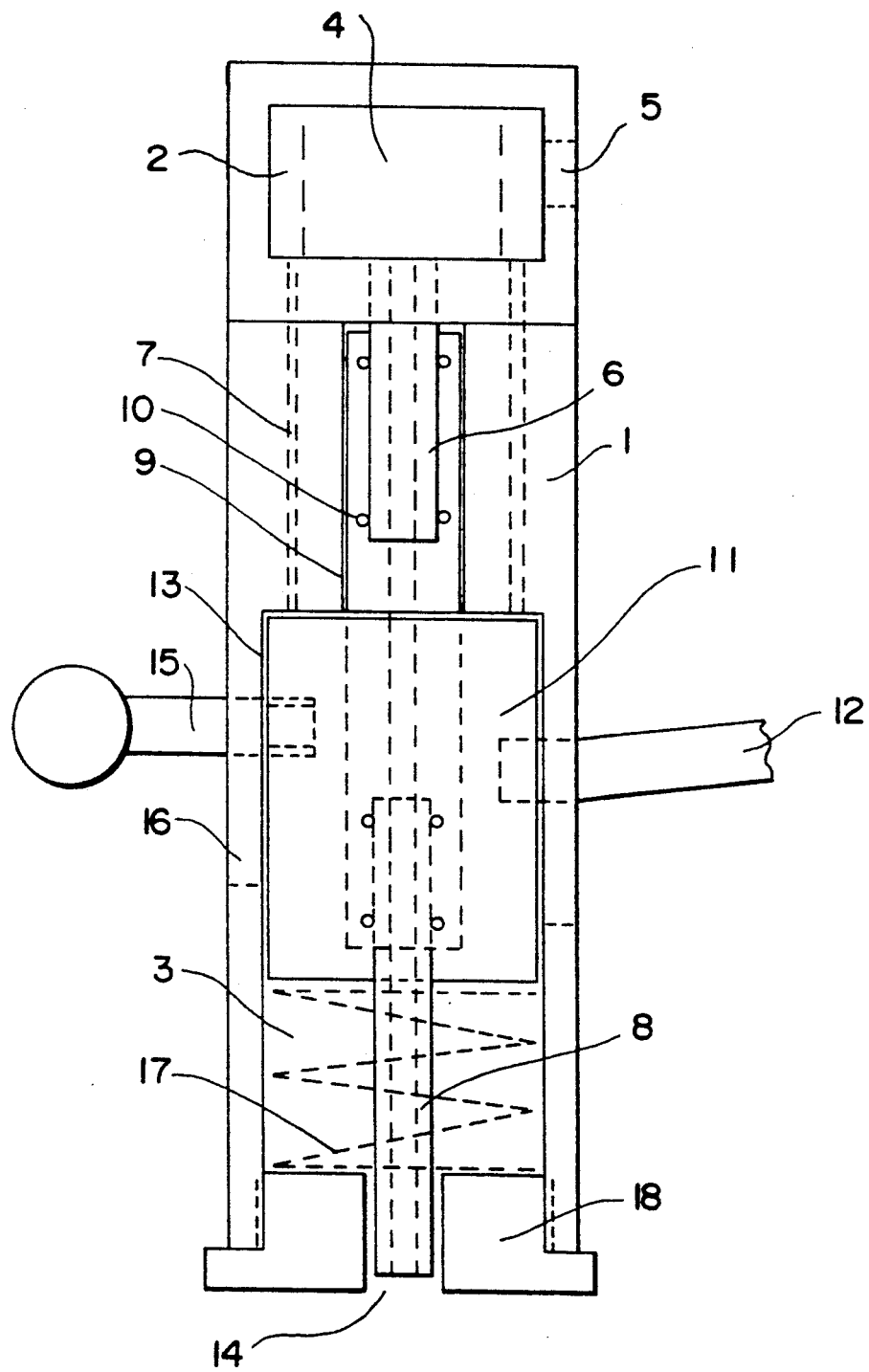
FIG. 1 is an elevation view of an underwater torch cutting and welding apparatus according to the invention.

Referring to FIG. 1 the cylindrical body 1 of the torch cutting and welding apparatus according to the invention comprises a first chamber 2 and a second chamber 3. A hydraulic motor 4 is disposed in the first chamber 2. The motor 4 comprises a cogwheel or an elliptic cogwheel or a corresponding unit driven by means of pressurized water from an external source (not shown). The first chamber 2 communicates with the external source of pressurized water through an inlet 5. The motor 4 has a shaft 6 connected to the cogwheel, elliptic cogwheel or a corresponding unit. The pressurized water drives the motor 4 which participates the shaft 6 a rotating or a reciprocating motion or a combination of these motions.

The first chamber 2 communicates with the second chamber 3 through cooling channels 7 which preferably consist of an annular channel.

An elongated electrode 8 is fitted in the second chamber 3. One end of the electrode is connected to the shaft 6 by means of a hollow cylindrical spacer 9. Both the shaft 6 and the electrode 8 are fitted inside the spacer 9 and held in position by means of seal rings 10. The rotating and/or reciprocating motion of the shaft 6 is thus transmitted to the electrode 8.

The electrode 8 is partially surrounded by an electrical conductor 11 disposed in the second chamber 3. The conductor 11 is preferably made of graphite. Electric current is conducted from an external power supply source (not shown) with a cable 12 through the conductor 11 to the electrode 8. The electrode 8 is connected to the negative pole of the power supply source.

The conductor 11 is so dimensioned that there is a space 13 between the outer surface of the conductor and the inner wall of the body. This space constitutes a flow channel 13 for pressurized water. The pressurized water fed into the apparatus drives the motor 4, flows from the first chamber 2 through the cooling channels 7 to the second chamber 3 and along said flow channel 13 to the bottom portion of the second chamber wherein the pressurized water cools the electrode 8 and finally leaves the apparatus through an opening 14 in the body. The pressurized water has several functions. Firstly, it drives the motor 4. Secondly, it cleans the surface of the conductor 11 and cools the conductor. Thirdly, it cools the electrode 8 and, fourthly, it contributes to remove the melt formed by the arc from the workpiece.

Further the apparatus according the invention comprises a pin 15 attached to the conductor 11 and extending out of the body through an opening 16 in the body wall. Upon pushing the pin 15 inwards the conductor 11 comes into contact with the spacer 9 interconnecting the shaft 6 and the electrode 8. The pin 15 can be moved from a first position wherein the free end of the electrode 8 is inside the body to a second operating position wherein the free end of the electrode 8 is outside the body. The pin 15 is held in the first position by means of a spring 17 positioned in the lower part of the second chamber 3 between the conductor 11 and a nozzle part 18 having an opening 14 for the electrode 8 and the pressurized water. The nozzle part 18 is made of a heat-resistant material such as ceramics. The pin 15 can be locked in the second operating position. This structure enables the cutting to be started for example in the middle of the workpiece and, when the electrode is in the non-operating position, protects the electrode from knocks and prevents damages on the diver's hose and other equipments.

The body 1 and the motor 4 are made of electrically non-conductive materials, such as plastics.

The apparatus according to the invention can be used as a "pen-type" small unit of the type shown in FIG. 1. The body of the apparatus can also be equipped with a handle or the like. Further the apparatus according to the invention can be a part of a mechanized torch cutting or welding device.

Due to its technics the apparatus is very small-sized and light, handy to use, easy to overhaul, contains few wearing or fragile parts, inexpensive to produce, suitable for most different kind of work without any big modifications.

The main advantages of the present invention are as follows:

1) The cutting process is controlled. Due to the technics of the apparatus the diver may work easily without any safety risks compared to the under water cutting work and technics of today. The cut is controlled and controllable. The cut is extremely clean. In addition, it is possible to control the shape of the edges (bevellings) of the cut workpiece by the shape of the electrode. As the shape of the electrode is changed, also the shape of the bevellings changes. The apparatus can also be used for making holes only. In this case the electrode penetrates through the material to be cut/perforated and makes a hole of its size or if desired, of bigger size.

2) The cutting can be started at any point, e.g. in the middle of the sheet to be cut. The apparatus is placed on the sheet. The electrode is pressed through the sheet and it is possible to start cutting the desired figure.

3) The apparatus is suitable for and enables under water torch cutting and welding mechanization as in above ground conditions.

4) Cuttings are easy to carry out in any position. On the basis of the rotation of the electrode and the cutting forms the melt to be exhausted falls to extremely small "balls" of about 0.01 to 0.1 inches. So small melt particles do not cause any risk to the diver because the melt cools rapidly.

5) It is possible to make a cutting of round, quadrangular or any other shape in a quickly, clean and safe manner.

6) Because no gases are used in the cutting and welding process, bubbles or other visual obstructions of the kind do not appear. The diver is able to see the cutting process clearly all the time as in the above ground welding process. There is no risk of gas or pressure explosions either, because no gases are used, as e.g. in oxygen are cutting.

7) The apparatus is water driven. As no oil hydraulics is used, it is inexpensive and ecologically benefical. The cooling works by the driving water.

8) A very safe apparatus compared to the apparatus now in use. There are no risks caused by gases, or rotating big discs, which may cut the hoses or slash the suit. The diver can control the apparatus all the time because visual obstctions do not appear, neither is the force of the apparatus so great that it would "break away" from the diver's hands and cause damage.

What is claimed is:

1. An apparatus for underwater torch cutting and welding comprising a body having at least a first chamber and a second chamber; a hydraulic motor fitted in said first chamber and communicating with an external source of a pressurized liquid medium, said motor having a movable shift; an elongated electrode one end of which is connected to said shaft, and at least a portion of said electrode being adapted to extend out of said body through an opening in said body, said motor comprising means for selectively transmitting through said shaft to said electrode any of a rotating motion, a reciprocating motion and a combined rotating and reciprocating motion; electrically conductive means fitted in said second chamber around at least a portion of said electrode and through which conductive means electric current is conducted from an external power supply source to said electrode.

2. An apparatus as claimed in claim 1 further comprising means defining a passageway from said first chamber through said second chamber to said opening in said body for said pressurized liquid medium.

3. An apparatus as claimed in claim 1 wherein said pressurized liquid medium is water.

4. An apparatus as claimed in claim 1 further comprising means for selectively maintaining said electrode in either of a first position wherein the free end of said electrode is inside said body and a second operating position wherein said free end of said electrode is outside said body.

5. An apparatus as claimed in claim 4 wherein said means for selectively maintaining comprise a pin attached to said electrically conductive means and extending out of said body through an opening in said body.

6. An apparatus as claimed in claim 1 further comprising a cylindrical spacer connecting said one end of the electrode to said shaft of the motor.

7. An apparatus as claimed in claim 1 wherein said body and said motor are made of an electrically non-conductive material.

8. An apparatus as claimed in claim 1 further comprising means for feeding said liquid medium through said body for (i) driving said motor, (ii) cooling said electrode and (iii) removing melt from a workpiece.

9. An apparatus as claimed in claim 1 further comprising means for feeding said liquid medium through said body for (i) driving said motor, (ii) cooling and cleaning said electrically conductive means, (iii) cooling said electrode and (iv) removing melt from a workpiece.

10. An apparatus as claimed in claim 1 wherein said electrode is a consumable electrode.

11. An apparatus as claimed in claim 1 wherein said electrode is a non-consumable electrode.

12. An apparatus as claimed in claim 11 wherein said non-consumable electrode is made of tungsten.

13. An apparatus for underwater torch cutting and welding comprising a body having at least a first chamber and a second chamber; a hydraulic motor fitted in said first chamber and communicating with an external source of a pressurized liquid medium, said motor having a movable shaft; an elongated electrode one end of which is connected to said shaft, and at least a portion of said electrode being adapted to extend out of said body through an opening in said body; electrically conductive means fitted in said second chamber around at least a portion of said electrode and through which conductive means electric current is conducted from an external power supply source to said electrode, said apparatus comprising means for cutting into a workpiece by means of said elongated electrode and for moving said electrode in a desired path along the workpiece to make a cutting of a desired shape; and means for communicating said first chamber with said external source of a pressurized liquid medium.

14. An apparatus as claimed in claim 13 further comprising means defining a passageway from said first chamber through said second chamber and through said opening in said body through which said electrode also extends, whereby said liquid medium is received into said first chamber for powering said hydraulic motor and is communicated along said electrode and discharged from said apparatus through said opening in said body through which said electrode extends.

15. A method of underwater torch cutting by means of an apparatus comprising a body having at least a first chamber and a second chamber; a hydraulic motor fitted in said first chamber and communicating with a source of a pressurized liquid medium, said motor having a movable shaft; an elongated electrode one end of which is connected to said shaft, and at least a portion of said electrode being adapted to extend out of said body through an opening in said body; electrically conductive means fitted in said second chamber around at least a portion of said electrode and through which conductive means electric current is conducted from an external power supply source to said electrode, the method comprising the steps of:

transmitting pressurized liquid medium to said first chamber for driving said motor and moving said shaft;

connecting said conductive means to said external power supply source; and cutting into a workpiece by means of said elongated electrode and moving said electrode in a desired path along the workpiece to make a cutting of a desired shape.

16. A method as claimed in claim 15, further comprising the step, prior to said step of cutting, moving said elongated electrode axially to project through said opening.

17. A method as claimed in claim 16, further comprising the step, after said step of cutting, moving said elongated electrode axially to be withdrawn into said opening.

18. A method as claimed in claim 15, further comprising the step of transmitting said pressurized liquid medium from said first chamber to said second chamber.

19. A method as claimed in claim 15, further comprising the step of transmitting said pressurized liquid medium from said first chamber to said second chamber and discharging said liquid medium through said opening in said body.

* * * * *